United States Patent [19]

Heinz

[11] Patent Number: 4,498,681
[45] Date of Patent: Feb. 12, 1985

[54] UNIVERSAL SEAL CAGE LANTERN RING WITH CHANNELS AND FLUID SLOTS

[76] Inventor: Larry Heinz, 4691 Anthony Pl. NW., Albany, Oreg. 97321

[21] Appl. No.: 610,969

[22] Filed: May 16, 1984

[51] Int. Cl.³ .............................................. F16J 15/18
[52] U.S. Cl. ..................................... 277/215; 277/59; 277/70; 277/139; 277/237 R; 267/1.5
[58] Field of Search ................... 277/59, 70, 139, 140, 277/214, 215, 237; 267/1.5

[56] References Cited

U.S. PATENT DOCUMENTS

| | | | |
|---|---|---|---|
| 1,557,379 | 10/1925 | Sudekum | 277/139 |
| 2,486,359 | 10/1949 | Mayfield | 277/237 X |
| 3,357,693 | 12/1967 | Perry | 267/1.5 |
| 3,528,666 | 9/1970 | Prampart | 277/70 X |
| 3,528,667 | 9/1970 | Spaven | 277/139 |
| 3,825,270 | 7/1974 | Paramonoff et al. | 277/59 X |
| 3,834,715 | 9/1974 | Butler | 277/59 X |

FOREIGN PATENT DOCUMENTS 249415  3/1926  United Kingdom ................. 277/59

Primary Examiner—Robert S. Ward
Attorney, Agent, or Firm—Charles N. Hilke

[57] ABSTRACT

A Universal Seal Cage Lantern Ring (USCLR) with channels and fluid slots disposed therein which allow fluid to circulate and which provide flexibility. Furthermore, USCLR fluid indentations are provided on about every third to fifth fluid slot for additional fluid circulation. The USCLR is constructed in an undefined length and wraps around a shaft forming a single complete ring around any given sized shaft for which it is cut. Either the continuous lands or the intermittent lands may form the inside diameter of the USCLR.

19 Claims, 12 Drawing Figures

U.S. Patent  Feb. 12, 1985  4,498,681
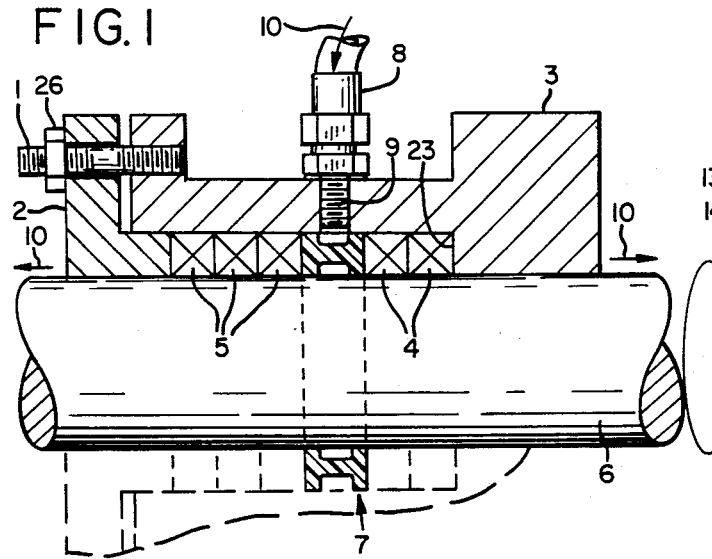
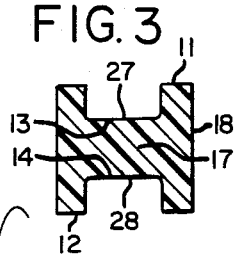
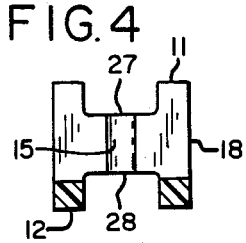
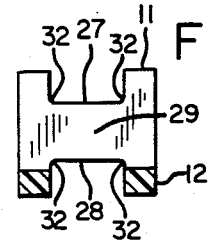
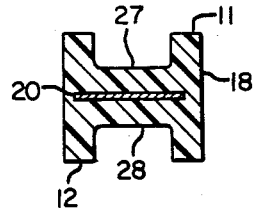
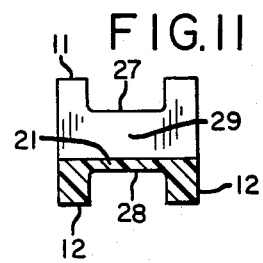
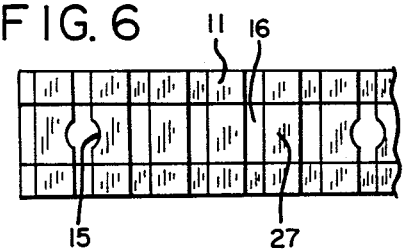
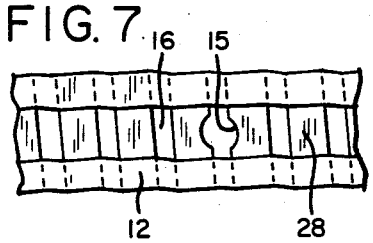
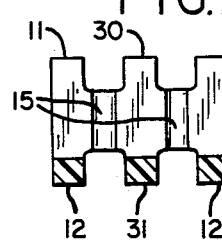
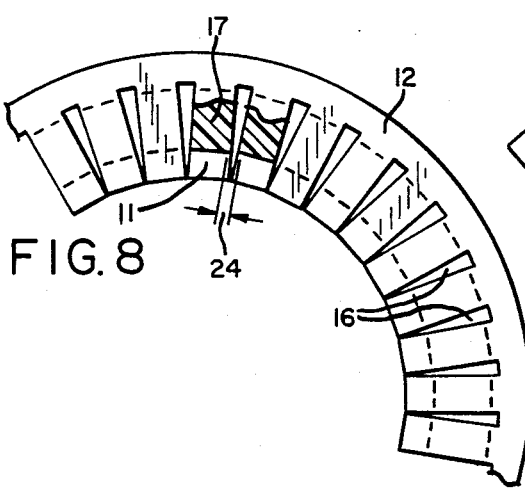
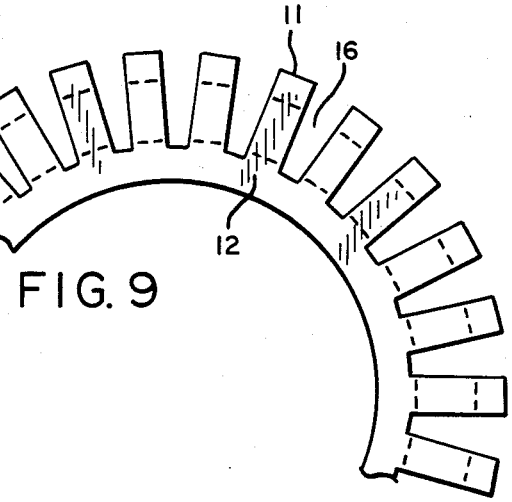

UNIVERSAL SEAL CAGE LANTERN RING WITH CHANNELS AND FLUID SLOTS

BACKGROUND OF THE INVENTION

The present invention relates to a lantern ring or seal cage placed between packing which receives fluid from an external source to cool, lubricate and seal the packaging and to cool and lubricate the rotating shaft. U.S. Pat. No. 1,532,961 discloses a rod and stem packing with inner grooves or slots disposed therein for supplying a lubricant to the rod or shaft. U.S. Pat. No. 501,207 shows a washer having slits on its outer periphery which are cut to form individual washers. U.S. Pat. No. 4,157,833 shows a sealing ring with diameter indicia that enables it to be cut to proper lengths in the field without the use of a mandril. U.S. Pat. No. 1,514,192 discloses a piston rod packing which is provided with V-shaped slots and comes in coiled form which may be cut to suitable lengths to fit different sized shafts. Finally, U.S. Pat. No. 1,653,439 illustrates a packing cut to any suitable length and which may be bent into selected form.

As is well known in the prior art, lantern rings or seal cages with holes drilled through them are provided in pre-formed sizes with fixed interior diameter and outer diameter dimensions.

OBJECT OF THE INVENTION

An object of the invention is to provide a Universal Seal Cage/Lantern Ring (USCLR) which fits or wraps around any shaft diameter.

A further object is to provide USCLRs of different widths.

Another object is to provide USCLR thickness which corresponds to the packing thickness.

A further object is to provide flexibility while retaining strength.

Another further object is to provide passages for fluid to flow through the USCLR.

A further object is to increase lubrication and cooling capabilities.

Another object is to provide a plurality of filtering means within the USCLR.

A further object is to prevent fluid surging.

To provide ease of installation and removal at machine's site is an object of the invention.

To provide a quick means for replacement of Seal Cages or Lantern Rings.

A final object is to provide economical Universal Seal Cage/Lantern Rings.

To reduce inventory costs is another economic object.

SUMMARY OF THE INVENTION

These and other objects are achieved by the present invention by means of the use of a Universal Seal Cage/Lantern Ring (USCLR) comprising a linear flexible material form with an intermittent channel, a continuous channel, a body web, intermittent lands, continuous lands, and fluid slots. The USCLR wraps around a shaft with flexibility provided by the fluid slots and the flexible continuous lands. Water or other fluid flows through the fluid slots and fluid indentations to the shaft. The USCLR length is cut from a continuous roll to wrap around the shaft forming a ring. The USCLR thickness corresponds to the packing thickness. A wider USCLR also comprises a center intermittent land and a center continuous land.

BRIEF DESCRIPTION OF THE DRAWINGS

The Universal Seal Cage/Lantern Ring (USCLR) of the present invention is exemplified by the drawings but is not limited thereby.

FIG. 1 shows a USCLR in use in a front cross-section view.

FIG. 2 is a side view of the USCLR.

FIG. 3 is a cross-section along line 3—3 of FIG. 2 showing a full cross-section.

FIG. 4 is a cross-section view along lines 4—4 of FIG. 2 showing a USCLR fluid indentation.

FIG. 5 is a cross-section view of the USCLR fluid slot in cross-section along lines 5—5 of FIG. 2.

FIG. 6 is a top view showing the USCLR indentations in every fifth slot and the intermittent lands.

FIG. 7 is a bottom view showing the USCLR indentations in every fifth USCLR fluid slot and the continuous lands in the failure mode.

FIG. 8 is a side view of the USCLR as wrapped around a shaft with the continuous lands forming the outside diameter.

FIG. 9 is a side view of the USCLR showing the continuous lands forming the inside diameter around the shaft.

FIG. 10 is a cross-section view showing a band of material embedded within the USCLR.

FIG. 11 is a cross-section view showing a different embodiment of the USCLR fluid slot.

FIG. 12 shows in cross-section the double width USCLR.

DETAILED DESCRIPTION OF THE INVENTION

The embodiments herein described explain and exemplify the Universal Seal Cage/Lantern Ring (USCLR) of the present invention. Other modifications will be readily apparent from the description and are also included herein.

In FIG. 1 the USCLR 7 is shown in its proper position within a packing gland casing 3 around the shaft 6. Inner packings 4 appear on one side of the USCLR 7 and outer packings 5 appear on the other side of the USCLR 7. The nut 26 is screwably attachable to the stud 1 permitting movement of the packing follower 2. The USCLR 7 is located under a fluid inlet hole 9 and fluid inlet nipple 8 through which water 10 or other fluid flows. The rotating shaft 6 of a machine is also shown.

In FIG. 2 the USCLR 7 is shown in linear form. The fluid slots 16 are shown. At the base of the fluid slots 16 a fluid slot bevel 25 is provided. Intermittent lands 11 and continuous lands 12 are shown in side view.

FIG. 3 shows a cross-sectional view where the USCLR 7 appears solid. Intermittent channel 13 and continuous channel 14 are clearly shown with intermittent lands 11 and continuous lands 12. The solid body web 17 connects the intermittent lands 11 and continuous lands 12. Packing faces 18 form the sides of the USCLR 7. Intermittent body web base 27 and continuous body web base 28 are shown.

FIG. 4 shows the USCLR 7 with the fluid indentation 15 embedded in the body web 17 in order to interconnect the intermittent channel 13 to the continuous channel 14. This provides a means for fluid passage.

FIG. 5 shows a cutaway through the fluid slot 16 showing and adjacent body web face 29. Channel bevels 32 are also shown. The body web face 29 is shown without a fluid indentation 15. The continuous lands 12 interconnect the body webs 17.

FIG. 6 and FIG. 7 shows the fluid indentations 15 which appear as half moons embedded in the body web 17. The two figures (i.e. 6 & 7) show the intermittent lands 11 and intermittent channel 13 as compared to continuous lands 12 and continuous channel 14. In FIG. 7, the failure mode of the USCLR 7 is shown. Note that the continuous lands 12 position above the fluid slots 16 have deformed. Note also that one packing side 18 has moved relative to the other packing side 18. Thus, the width of the USCLR 7 is less when in the deformed state.

In FIG. 8 the intermittent lands 11 touch together around the shaft 6. However, an opening through the fluid slots 16, minimum USCLR slot opening 24, allows the fluid 10 to flow to the shaft 6 and between the intermittent lands 11 and shaft 6.

In FIG. 9, the continuous lands 12 are wrapped around the shaft 6. Fluid 10 will readily flow to the shaft 6 in this form.

In FIG. 10 a continuous band 20 is inserted throughout the body web 17. Note that fluid indentation s15 are drilled from the intermittent body web base 27, through the continuous band 20, and to the continuous body web base 28.

In FIG. 11, the fluid slot 16 is not cut through the entire body web 17. Instead a fluid slot base 21 forms a continuous interconnection with the continuous lands 12 throughout the USCLR 7. Note that fluid 10 will flow through fluid indentations 15 embedded on body web base 29 and drilled through fluid slot base 21 to continuous body web base 28.

FIG. 12 shows the double width USCLR 7. The center intermittent lands 30 and the continuous lands 31 are added. Fluid indentation 15 is shown.

The preferred fluid 10 is water and the orientation of the USCLR 7 is such that the intermittent lands 11 are adjacent to the shaft 6. In operation, water 10 flows through the fluid inlet nipple 8 and the fluid inlet hole 9 into the continuous channel 14 and onto the continuous body web bases 28 of the USCLR 7. The water 10 will then flow through the fluid slots 16 and the fluid indentations 15 onto the rotating shaft 6. It is preferred that the fluid indentations 15 occur on the adjacent faces of every fifth body web. Of course, the water 10 fills the intermittent channel 13 up to the intermittent body web bases 27. In some cases, a sleeve (not shown) surrounds the shaft 6. The water 10 then flows under the intermittent lands 11 and over the shaft 6 or sleeve (not shown). The water 10 continues down the shaft 6 under both the inner packing 4 and the outer packing 5 finally exiting from under the packing gland casing 3 and the packing follower 2. With proper installation, neither inner packing 4, outer packing 5, nor USCLR 7 rotate with the shaft 6.

The seal is formed by the water 10 which is located throughout the inner packing 4, the USCLR 7 and the outer packing 5 and between the rotating shaft 6 and the inner packing 4, the USCLR 7 and the outer packing 5. The water 10 is an expendable and constantly replenished seal. If the machine is under less than atmospheric pressure, the seal prevents any leakage of, for example, air into the machine. If the machine is at greater than atmospheric pressure, the seal prevents leakage of, for example, stock or material out of the machine. In this last case the water 10 is pressurized to overcome the pressure within the machine.

The preferred orientation described provides the maximum strength and density (see FIG. 8). Another preferred orientation provides maximum fluid flow where the continuous lands 12 are adjacent to the rotating shaft 6 (see FIG. 9).

When replacing the outer packing 5, inner packing 4, and the USCLR 7, the nut 26 is removed from the stud 1. The packing follower 2 slides over and off the stud 1. A tool (not shown) with a corkscrew end is turned into outer packing 5 and pulls the outer packing 5 from within the packing gland casing 3. Similarly, each piece of outer packing 5, USCLR 7, and inner packing 4 are removed. New inner packing 4 slides along the shaft 6 and abuts against the packing gland casing seat 23. The number of inner packing 4 is chosen so that the USCLR 7 will be directly underneath the fluid inlet hole 9. The USCLR 7 is cut from a roll of USCLR 7 material so that the length of USCLR 7 corresponds to the circumference of the shaft 6. The USCLR 7 is placed around the shaft 6 and slid under the fluid inlet hole 9. Outer packing 5 is added and the packing follower 2 is placed against the outer packing 5. Nut 26 is tightened compressing the outer packing 5 and inner packing 4 to form a seal around the shaft 6. The USCLR 7 transmits the compressive force caused by the pacing follower 2 from outer pacing 5 to inner packing 4. Note that the USCLR 7 height dimension is 0.012-0.025 thousandths of an inch less than the corresponding packing size selected. This allows for ease of installation and removal.

With respect to preferred materials for the USCLR 7, operating temperatures are crucial. It is preferred that polyethylene be used in a temperature range up to 225° F.; nylon or polypropylene is preferred for temperatures from 225° to 350°; and Teflon is preferred in use from 350° F. to 500° F.

In operation, failures in fluid flow, packing, packing gland casing, shaft, or machine can cause severe damage. The USCLR 7 is designed so that excessive forces and heat will cause bending and deformation in the continuous lands 12 positioned under the fluid slots 16. Please see FIGS. 4 and 5 which show the positions that the failure occurs in the continuous lands 12. This allows one packing face 18 to move independently of the other packing face 18 causing a reduction in the width of the USCLR 7 (See FIG. 7). This failure mode of the USCLR 7 prevents damage.

It will be apparent that various modifications can be made in the particular USCLR described in detail. Therefore, the scope of the invention is limited only by the following claims.

I claim:
1. A universal seal cage/lantern ring comprising:
   (a) at least one continuous land;
   (b) a plurality of body webs joined together by said continuous land;
   (c) at least one intermittent land projecting from each said body web;
   (d) a plurality of fluid slots defined by adjacent faces of body webs;
   (e) intermittent channels defined by intermittent lands and a plurality of intermittent body web bases; and
   (f) continuous channels defined by continuous lands and a plurality of continuous body web bases.
2. The universal seal cage/lantern ring of claim 1 wherein said continuous lands are two continuous lands and wherein said intermittent lands are two intermittent lands.

3. The universal seal cage/lantern ring of claim 2 wherein a center intermittent land and a center continuous land are added.

4. The universal seal cage/lantern ring of claim 1 wherein said continuous lands are three, said intermittent lands are three, said intermittent channels are two, and said continuous channels are two.

5. The universal seal cage/lantern ring of claim 1 wherein said adjacent faces of body webs include fluid indentations.

6. The universal seal cage/lantern ring of claim 1 wherein said body webs contain holes.

7. The universal seal cage/lantern ring of claim 1 wherein every fifth said adjacent faces of body webs include indentations.

8. Universal seal cage/lantern ring of claim 3 wherein each said adjacent face of said body web includes two fluid indentations.

9. The universal seal cage/lantern ring of claim 1 wherein a base of said fluid slot is bevelled in said continuous land.

10. The universal seal cage/lantern ring of claim 1 wherein the intersection of said body web base with said continuous lands and with said intermittent land is bevelled.

11. The universal seal cage/lantern ring of claim 1 wherein a minimum fluid slot opening is defined by contact of each said intermittent land with another said intermittent land.

12. The universal seal cage/lantern ring of claim 1 wherein the non-parallel adjacent faces of said body web acts as a filter.

13. The universal seal cage/lantern ring of claim 1 wherein the material of said universal seal cage/lantern ring is polyethylene.

14. The universal seal cage/lantern ring of claim 1 wherein the material of said universal seal cage/lantern ring is polypropylene.

15. The universal seal cage/lantern ring of claim 1 wherein the material of said universal seal cage/lantern ring is nylon.

16. The universal seal cage/lantern ring of claim 1 wherein the material of said universal seal cage/lantern ring is Teflon.

17. The universal seal cage/lantern ring of claim 1 wherein said continuous lands are deformable.

18. A universal seal cage/lantern ring comprising;
a. at least one continuous land;
b. a plurality of body webs joined together by said continuous land and continuous fluid slot base;
c. at least one intermittent land projecting from each said body web;
d. a plurality of fluid slots defined by adjacent faces of body webs and said continuious fluid slot bases.
e. intermittent channels defined by intermittent lands and a plurality of body intermittent web bases;
f. continuous channels defined by continuous lands and a plurality of continuous body web bases; and
g. where some said adjacent faces of said body webs include fluid indentations through said continuous fluid slot base to said continuous body web base.

19. A universal seal cage/lantern ring comprising:
a. at least one continuous land;
b. a continuous band;
c. a plurality of body webs joined together by said continuous band;
d. at least one intermittent land projecting from each said body web;
e. intermittent channels defined by intermittent lands and a plurality of intermittent body web bases;
f. continuous channels defined by continuous lands and a plurality of continuous body web bases; and
g. fluid indentations from said intermittent body web base, through said continuous band, and to said continuous body web base.

* * * * *